US012798195B2

(12) United States Patent
Li et al.

(10) Patent No.: US 12,798,195 B2
(45) Date of Patent: Nov. 17, 2026

(54) AUTOMATED METHOD FOR EXTRUSION SYSTEM PARAMETER SELECTION IN MATERIAL EXTRUSION ADDITIVE MANUFACTURING

(71) Applicant: Shanghai Fusion Tech Co., Ltd., Shanghai (CN)

(72) Inventors: Jianzhe Li, Shanghai (CN); Pinyi Wu, Shanghai (CN); Zhongwei Yu, Shanghai (CN); Jianmin Ye, Shanghai (CN); Zhewen Ma, Shanghai (CN); Jiang Yu, Shanghai (CN); Jinjing Zhang, Shanghai (CN); Hua Feng, Shanghai (CN)

(73) Assignee: Shanghai Fusion Tech Co., Ltd., Shanghai (CN)

( * ) Notice: Subject to any disclaimer, the term of this patent is extended or adjusted under 35 U.S.C. 154(b) by 667 days.

(21) Appl. No.: 18/313,624

(22) Filed: May 8, 2023

(65) Prior Publication Data

US 2024/0375354 A1 Nov. 14, 2024

(51) Int. Cl.

| | |
|---|---|
| ***B29C 64/393*** | (2017.01) |
| ***B29C 64/268*** | (2017.01) |
| ***B33Y 50/02*** | (2015.01) |
| *B33Y 10/00* | (2015.01) |
| *B33Y 30/00* | (2015.01) |

(52) U.S. Cl.

CPC .......... *B29C 64/393* (2017.08); *B29C 64/268* (2017.08); *B33Y 30/00* (2014.12); *B33Y 50/02* (2014.12)

(58) Field of Classification Search

CPC ..... B29C 64/393; B29C 64/268; B33Y 30/00; B33Y 50/02; B33Y 50/00; B33Y 10/00

USPC .......................................................... 700/119

See application file for complete search history.

(56) References Cited

U.S. PATENT DOCUMENTS

| | | | | |
|---|---|---|---|---|
| 2017/0050383 | A1* | 2/2017 | Bell | B33Y 50/02 |
| 2019/0362541 | A1* | 11/2019 | Balestra | G06T 7/97 |
| 2023/0356472 | A1* | 11/2023 | Feinberg | A61L 27/52 |

* cited by examiner

*Primary Examiner* — Michael J Brown
(74) *Attorney, Agent, or Firm* — AVEK IP, LLC

(57) ABSTRACT

Some embodiments of the disclosure provide a method for calibrating extrusion parameters in an additive manufacturing system. In some examples, the method includes the following steps. (1) Executing extrusion commands and printing a plurality of tracks based on one or more printing templates at different extrusion rates. (2) Scanning the plurality of tracks to obtain at least one image of the plurality of tracks. (3) Processing the at least one image of the plurality of tracks to obtain geometry information. (4) Generating a printing model based on the geometry information and the extrusion commands. (5) Evaluating the printing model. (6) If the printing error result is within the pre-defined threshold, adopting the printing model as a reference for choosing extrusion parameters at a given extrusion rate. (7) If the printing error result is not within the pre-defined threshold, repeating steps (1)-(6).

18 Claims, 9 Drawing Sheets

AUTOMATED METHOD FOR EXTRUSION SYSTEM PARAMETER SELECTION IN MATERIAL EXTRUSION ADDITIVE MANUFACTURING

FIELD OF THE DISCLOSURE

The disclosure relates generally to the field of 3D printing. More specifically, the disclosure relates to automated methods for calibrating extrusion systems parameters in material extrusion additive manufacturing processes.

BACKGROUND

Additive Manufacturing (AM) has been gaining a lot of popularity for its fast-prototyping advantage and commercial availability. Among all AM methods, material extrusion additive manufacturing (MEAM) is the predominant method. High-quality MEAM process requires accurate synchronization between the extrusion system and the motion system. To achieve this goal, parameters in MEAM processes need to be properly chosen and calibrated.

Traditionally, parameters in MEAM processes are selected by users depending on previous experiences and/or other similar approaches. However, when subject to new materials and/or different working conditions (e.g., printing time, nozzle speed, extrusion rate, extruder temperature, bed temperature, printing speed, retraction condition, fan rotation parameters, flow control parameters, minimum/maximum layer time, minimum/maximum layer thickness, base plate adhesion, different nozzles, different printing materials, etc.), widely adopted traditional methods for calibrating parameters are still based on trial and error through sequential groups of test printing and quality evaluation.

An example of the traditional method is Marlin, which designed a printing pattern for the linear advance factor calibration (marlinfw.org/docs/features/lin_advance.html). In this Marlin pattern, a series of tracks are printed with different pre-chosen linear advance factor(s) applied for each track. However, the linear advance factor calibration method as recited in Marlin is flawed at least because users are still required to choose the optimal set of parameters by evaluating the printing quality of the printed tracks after they are printed; users still need to spend a lot of time and a lot of printing materials in the linear advance factor calibration process given different working conditions despite only straight tracks are printed; and users still need to re-tune parameters when working conditions change since the previously well-tuned parameters are only valid for a specific set of working conditions.

To tune retraction settings in MEAM processes according to Marlin and other traditional methods, users print CAD models that require numerous retractions within each layer (e.g., cylindrical tower tests, www.yeggi.com/q/retraction+tower+test/) and change the parameters until no stringing (a.k.a., oozing, whiskers, or "hairy" prints) of the printing material is noticed.

In summary, these traditional trial and error methods do not extend and/or apply well to various MEAM processes and can also be extremely time-consuming and material-consuming due to their trial and error nature. Additionally, the previous printing results in these traditional methods are only valid for a specific set of working conditions and cannot be quantified and/or adopted for reference in subsequent tuning experiments in these traditional methods when working conditions change.

SUMMARY

The following presents a simplified summary of the invention in order to provide a basic understanding of some aspects of the invention. This summary is not an extensive overview of the invention. It is not intended to identify critical elements or to delineate the scope of the invention. Its sole purpose is to present some concepts of the invention in a simplified form as a prelude to the more detailed description that is presented elsewhere.

In some embodiments, the disclosure provides a method for calibrating extrusion parameters in an additive manufacturing system. The method includes the following steps.

(1) Executing extrusion commands and printing a plurality of tracks based on one or more printing templates at different extrusion rates.

(2) Scanning the plurality of tracks to obtain at least one image of the plurality of tracks.

(3) Processing the at least one image of the plurality of tracks to obtain geometry information. The geometry information includes width and height of each one of the plurality of tracks.

(4) Generating a printing model based on the geometry information and the extrusion commands.

(5) Evaluating the printing model by following steps: (5.1) printing at least one test and collecting printing data from the at least one test, (5.2) comparing the printing data with data produced from the printing model to obtain a printing error result, and (5.3) determining whether the printing error result is within a pre-defined threshold.

(6) If the printing error result from step (5) is within the pre-defined threshold, adopting the printing model in step (4) as a reference for choosing extrusion parameters at a given extrusion rate.

(7) If the printing error result from step (5) is not within the pre-defined threshold, repeating steps (1)-(6).

Optionally, the extrusion commands are compiled in G-code.

Optionally, the one or more printing templates include at least one item selected from the group consisting of a steady-state template, a material leakage template, and a velocity transition template.

Optionally, the height is obtained by a laser distance sensor, the laser distance sensor being part of a scanning module.

Optionally, step (2) includes projecting a laser beam towards at least one of the printed tracks at an angle along a direction on a printing bed, the laser beam is generated by a laser module, and the laser module is part of a scanning module.

Optionally, the angle is between about 45 degrees to about 50 degrees.

Optionally, step (3) includes the following steps: (3.1) converting a color image to a gray image, the color image being captured by a camera; (3.2) filtering high frequency noises from the gray image; (3.3) for each one of the plurality of tracks, determining a location point and a straight line through the location point in the gray image; and (3.4) for each one of the plurality of tracks, determining the width using intersection points of: the straight line associated with a respective said track; and portions of the respective said track highlighted by the laser beam.

Optionally, the width of a respective said track is determined using a distance between two edges of the respective said track along the direction of the laser beam on the printing bed.

Optionally, the width of a respective said track is determined using a distance between two of the intersection points.

Optionally, the printing model is generated by a polynomial function of second or higher order.

In other embodiments, the disclosure provides an additive manufacturing system. The system includes a processor, a printing nozzle, and a scanning module. The scanning module includes a camera and the processor is configured to perform the following steps.

(1) Executing extrusion commands and printing a plurality of tracks based on one or more printing templates at different extrusion rates.

(2) Scanning the plurality of tracks to obtain at least one image of the plurality of tracks.

(3) Processing the at least one image of the plurality of tracks to obtain geometry information. The geometry information includes width and height of each one of the plurality of tracks.

(4) Generating a printing model based on the geometry information and the extrusion commands.

(5) Evaluating the printing model by following steps: (5.1) printing at least one test and collecting printing data from the at least one test, (5.2) comparing the printing data with data produced from the printing model to obtain a printing error result, and (5.3) determining whether the printing error result is within a pre-defined threshold.

(6) If the printing error result from step (5) is within the pre-defined threshold, adopting the printing model in step (4) as a reference for choosing extrusion parameters at a given extrusion rate.

(7) If the printing error result from step (5) is not within the pre-defined threshold, repeating steps (1)-(6).

BRIEF DESCRIPTION OF THE DRAWINGS

Illustrative embodiments of the present disclosure are described in detail below with reference to the attached drawing figures.

DETAILED DESCRIPTION

The following describes some non-limiting exemplary embodiments of the invention with reference to the accompanying drawings. The described embodiments are merely a part rather than all of the embodiments of the invention. All other embodiments obtained by a person of ordinary skill in the art based on the embodiments of the disclosure shall fall within the scope of the disclosure.

Some embodiments of the disclosure provide an automated method for calibrating extrusion parameters of a 3D printer. In some embodiments of automated methods, a 3D printer first executes programmable extrusion commands to actuate one or more printing nozzles to print one or more straight or non-straight tracks based on pre-designed printing templates at various different extrusion rates on the printing bed of the 3D printer. The geometry information (e.g., width and height) of the printed tracks is then captured by one or more cameras in a scanning process and extracted by an internal or external processer in an image processing step. Next, a printing model is generated based on the extracted geometry information and the executed programmable extrusion commands. Last, the generated model is subjected to a model evaluation process and is then implemented as a reference for choosing extrusion parameters of the 3D printer if the error of the model evaluation process is within a pre-defined threshold. Aforementioned method steps may be repeated if the error of the model evaluation process is outside the pre-defined threshold Additionally, other embodiments of the disclosure provide an automated method for calibrating extrusions parameters of a 3D printer based on laser triangulation-based data acquisition and model formulation.

In some examples, the generated printing model may include various mathematical relationships among different printing parameters including, but not limited to: printing time, nozzle speed, extrusion rate, extruder temperature, bed temperature, printing speed, retraction condition, fan rotation parameters, flow control parameters, minimum/maximum layer time, minimum/maximum layer thickness, base plate adhesion, different nozzles, different printing materials, etc.

Figure 1:
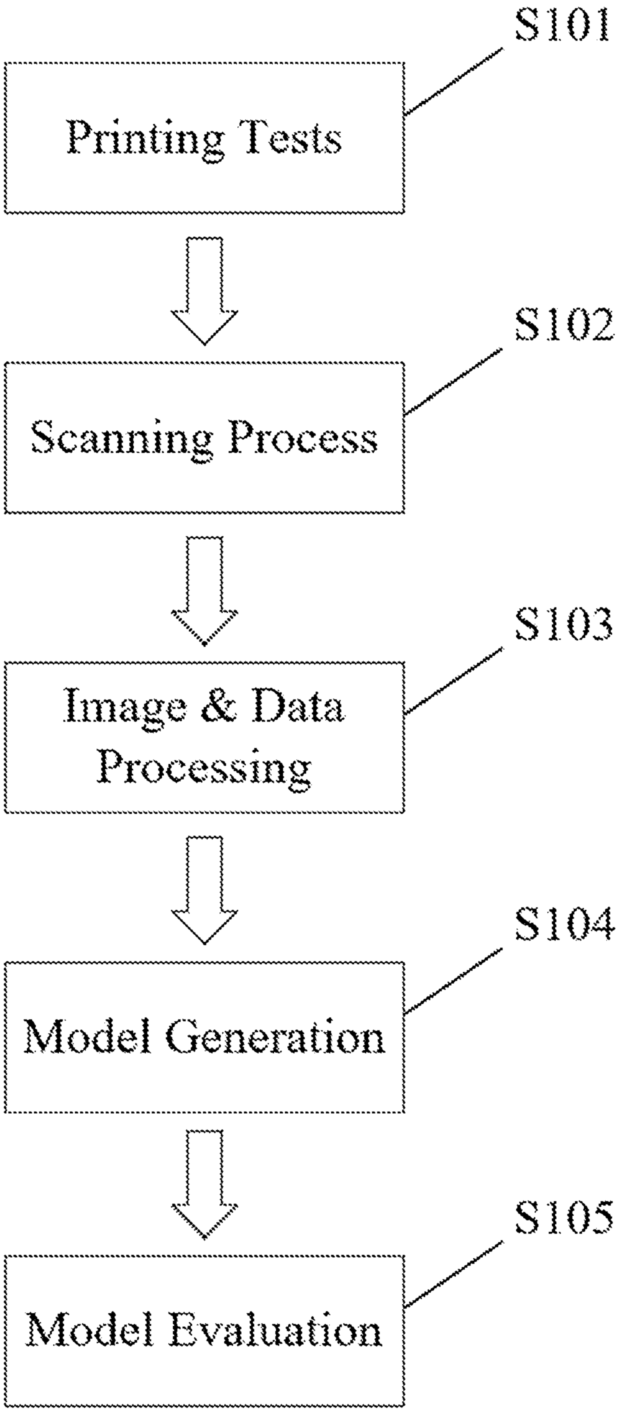
FIG. 1 shows a flowchart illustrating an automated method for calibrating extrusion parameters of a 3D printer according to an embodiment of the disclosure.

FIG. 1 is a flowchart illustrating an automated method for calibrating extrusion parameters of a 3D printer according to an embodiment of the disclosure. The method as shown in FIG. 1 may include the following steps: S101, S102, S103, S104, and S105. These steps will be explained in more details as follows.

Step S101 includes performing one or more printing tests according to pre-designed patterns, shapes, or designs in various printing templates at various extrusion rates. This may be done by one or more of the printing nozzles of a printing system (e.g., a 3D printer), and step S101 may also include performing one or more groups of various printing tests. In some examples of step S101, the printing system may execute programmable extrusion commands to acuate one or more printing nozzles of the printing system to print a series of parallel straight tracks based on pre-designed printing templates at different extrusion rates on its printing bed. Here, the executed programmable extrusion commands may be complied in G-code or other computer numerical control (CNC) programming languages.

It is worth noting that step S101 of the claimed method is not a trial and error process as implemented by other traditional calibration methods in 3D printing. A difference between the present disclosure and the traditional calibration methods includes at least that the traditional calibration methods are inefficient, time consuming, and material consuming because they require a lot of printing tests. Previous printing results of these traditional methods are only valid for a specific set of working conditions and cannot be quantified and/or adopted for reference in subsequent tuning experiments in these traditional methods when working conditions change. To the contrary, the present disclosure requires only limited number of printing tests (e.g., straight or non-straight tracks) which guarantees a low printing material consumption and a short printing time, and previous printing results may be quantified and/or adopted for reference in subsequent tuning experiments when working conditions change.

For step S101, a series of printing templates may be designed to identify and/or correspond to different printing parameters including, but not limited to: printing time, nozzle speed, extrusion rate, extruder temperature, bed temperature, printing speed, retraction condition, fan rotation parameters, flow control parameters, minimum/maximum layer time, minimum/maximum layer thickness, base plate adhesion, different nozzles, different printing materials, etc. These printing templates may be, individually or in combination, pre-designed before step S101, modified in real-time during step S101, and/or updated after step S101.

In some examples, the series of printing templates may include a steady-state template, a material leakage template, and/or a velocity transition template. One or more of these templates may be applied, individually or in combination, to different nozzles of the printing system for different nozzle performance evaluation processes.

Figure 2:
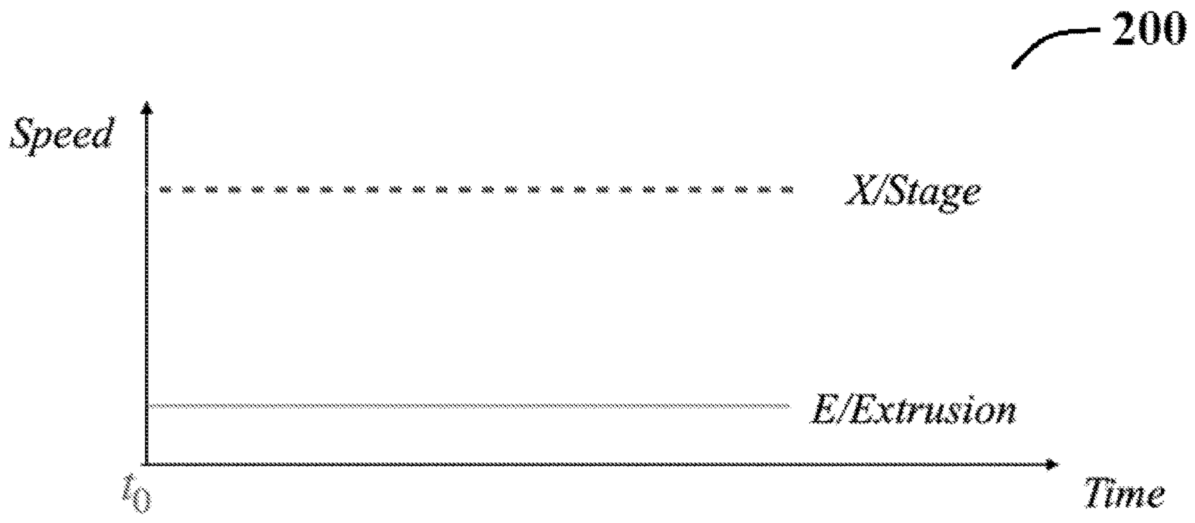
FIG. 2 shows an example of a steady-state printing template according an embodiment of the disclosure.

The steady-state template may be designed to map the relationship model between the flow/extrusion rate and the steady-state geometry. The identified relationship model may be used as reference to select one or more flow/extrusion rates to achieve one or more target widths and/or heights. There are various ways to implement such steady-state template. One example of the steady-state template 200 is shown in FIG. 2. In this example, both the speed of the printing stage and the speed of the extrusion remain stable with regards to the printing time.

Figure 3:
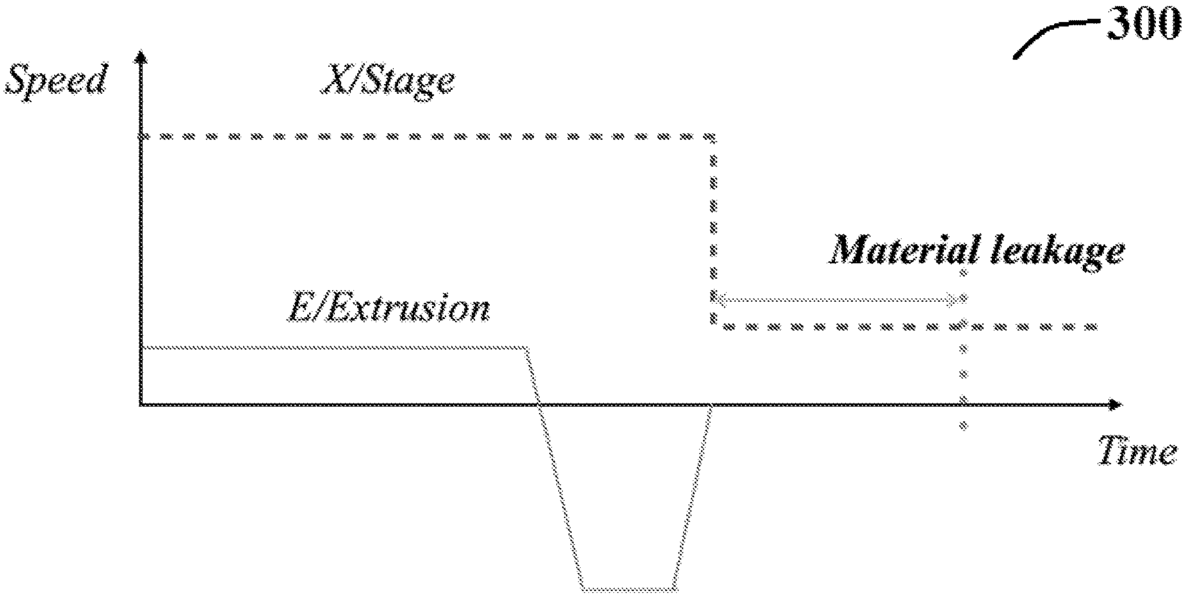
FIG. 3 shows an example of a material leakage printing template according an embodiment of the disclosure.

The material leakage template may be designed to map the relationship between flow/extrusion rate and material leakage time under a fixed retraction setting. The identified time then may be used for choosing the maximum non-extrusion travel distance. One example of the material leakage template 300 is shown in FIG. 3. In this example, the speed of the printing stage remains stable in the beginning and decreases substantially when a material leak takes place, and the speed of the extrusion remains stable in the beginning and then, before the material leak takes place, decreases linearly, remains stable, and increase linearly in sequence. It is worth noting, as shown in FIG. 3, that: (1) the speed of the extrusion, during the linear decreasing stage, may first reduce to zero and then increase in an opposite direction; (2) the speed of the extrusion, during the stable stage after the linear decreasing stage, may be at a steady speed in the opposite direction; and (3) the speed of the extrusion, during the linear increasing stage after the stable stage, may first decrease in the opposite direction and then reach zero.

Figure 4:
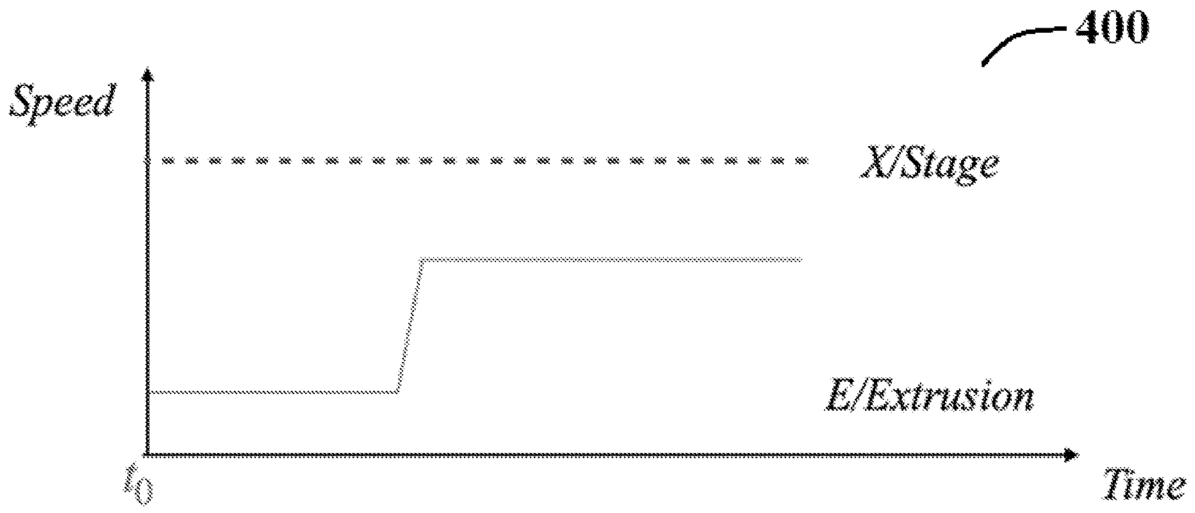
FIG. 4 shows an example of a velocity transition template according an embodiment of the disclosure.

The velocity transition template may be designed to explore the transient response when a change in the extrusion command is given to the extruder. The relationship between the identified transient response and extrusion command may be used for choosing the linear advance factor. One example of the velocity transition template 400 is shown in FIG. 4. In this example, the speed of the printing stage remains stable with regards to the printing time. The speed of the extrusion remains stable in the beginning, increases linearly afterwards, and then again remains stable at a speed higher than the first stable speed in the beginning with regarding to the printing time.

Step S102 includes a scanning process after the printing tests in step 101 to obtain the geometry information (e.g., width, height, etc.) of the printed tracks in step S101. In this step S102, the printing system now switches from one or more the printing nozzles in step S101 to a modified toolhead and repeat the same motion commands as those already performed in the printing tests in step S101. In some examples of step S102, the printing system may switch from one or more the printing nozzles in step S101 to a scanning module and the printing system may execute programmable motion commands complied in G-code or other computer numerical control (CNC) programming languages to repeat the same movements (motion commands) already performed by the printing nozzles in step S101. In other words, the scanning module of the printing system in step S102 follow the same moving trajectories of the printing nozzles in step S101. In these examples, the scanning module may include, individually or in combination, one or more cameras and/or one or more laser modules.

The one or more cameras may be configured to capture the geometry information of the printed tracks in step S102 by recorded images and/or videos. It is worth noting that while one or more cameras are utilized in the above examples, other optical sensors and/or detecting devices may also be used to capture the geometry information by digital and/or physical formats other than recorded images and/or recorded videos. It is further worth noting that while width and height are included in the captured geometry information in these examples of step S102. Other geometry information may also be captured and/or calculated by the printing system, including, but not limited to: width, height, length, depth, angle, orientation, track shape, track offset, track spacing, track density, track pattern, track design, etc.

In some examples, the scanning process in step S102 may include a laser triangulation scanning method and/or a laser distance sensor scanning method. One example 500 of the hardware implementation of the laser triangulation method and/or the laser distance sensor scanning method here in step S102 is shown in FIG. 5 based on a Raise3D® fused deposition modeling (FDM) printer.

Figure 5:
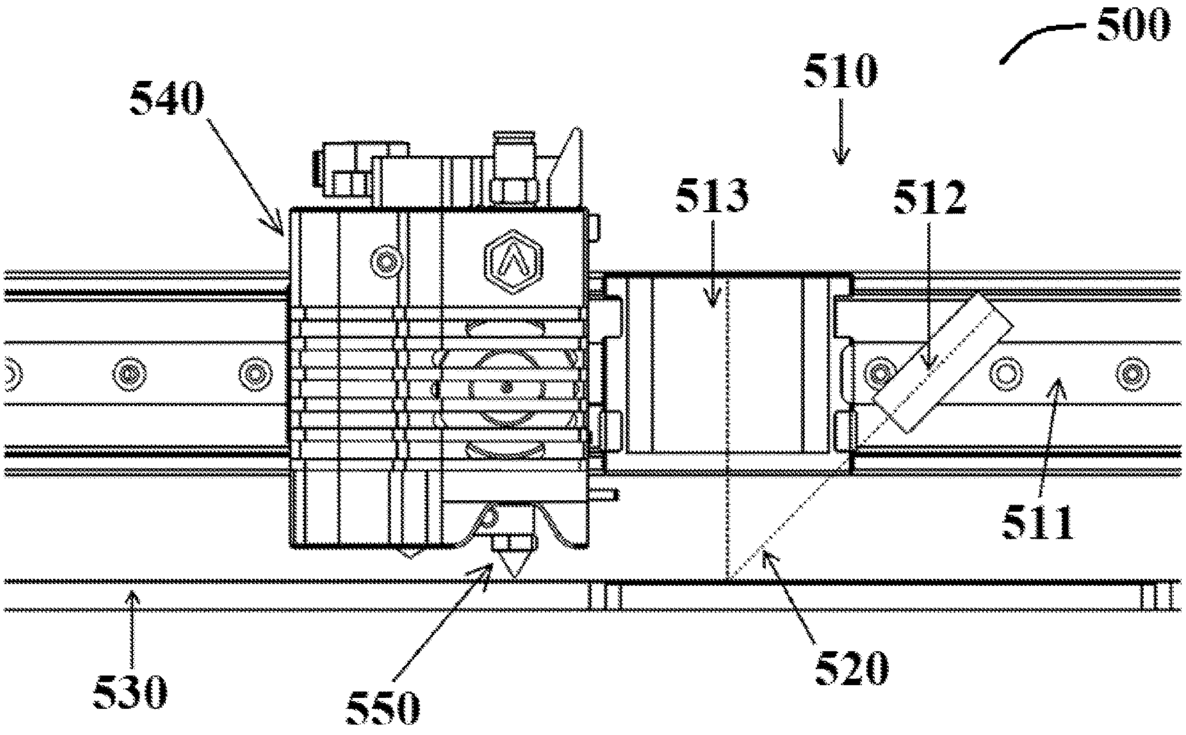
FIG. 5 shows a hardware implementation example of a laser triangulation method and/or a laser distance sensor scanning method according to an embodiment of the disclosure.

In the example 500 of the laser triangulation scanning method as shown in FIG. 5, a scanning module 510 may include a mounting bracket 511, a laser module 512, and a camera 513. The laser module 512 may be installed on the mounting bracket 511 and may generate one or more laser beams 520 at various angels. The generated angle may range from 0 to 90 degrees. When the angle is 0 degree, the laser beam 520 is parallel to the horizontal printing bed 530; and when the angle is 90 degrees, the laser beam 520 is perpendicular to the horizontal printing bed 530. In some examples, the angel may range from 45 to 50 degrees. In other examples, the angle may be exactly 48 degrees or exactly 42 degrees. The camera 513 may also be installed on the mounting bracket 511 and may capture and acquire image information. The image information may include geometry information (e.g., width and/or height) of the printed straight or non-straight tracks based on one or more pre-designed printing templates at one or more extrusion rates. Positions and orientations of both the laser module 512 and the camera 513 may be adjusted individually or in combination on the mounting bracket 511 as necessary for various printing and testing purposes. Alternatively or additionally, the one or more cameras 513 and the one or more laser modules 512 may also be positioned at other places with or without the mounting bracket 511.

The scanning module 510 as shown in FIG. 5 is adjacent to the extruder 540 and therefore has the same degree of freedom as the extruder 540. However, the scanning module 510 in other embodiments may be positioned at other places not adjacent to the extruder 540 and therefore may have a degree of freedom different from the that of the extruder 540. For example, another hardware implementation example of the laser triangulation method may be based on a Raise3D® E2 dual extruder printer where one of the two extruders may be removed and may be replaced with the scanning module 510 together with the mounting bracket 511 for installing the laser module 512 and the camera 513. In such an example, the scanning module 510 replaces one of the two extruders of the Raise3D® E2 printer. The control of the scanning module 510 may be dependent on or independent from the control of the remaining extruder. In other words, the scanning module 510 may have moving trajectories same as the remaining extruder or moving trajectories different from the remaining extruder.

In an example of the laser triangulation scanning method, the scanning module 510 may move along the printing direction of the printing nozzle 550 of the printing system and the geometry information of the printed tracks may be then captured in a video by one or more cameras 513. The laser generator in the laser module 512 for emitting the one or more laser beams 520 may be configured to highlight the printed tracks to avoid potential errors and background noises from the ambient illumination and/or the printing bed 530 surface.

In an example of the laser distance sensor scanning method as shown in FIG. 5, the scanning module 510 may, alternatively or additionally, include a complementary metal-oxide-semiconductor (CMOS) type micro laser distance sensor to capture the geometry information (e.g., width and/or height) of the printed tracks based on one or more pre-designed printing templates at one or more extrusion rates. When incorporated as a part of the scanning module 510, the CMOS type micro laser distance sensor may be configured to be vertical to the printing bed 530 and may be configured to probe the distance between the laser module 512 and the printed tracks with a precision of 10 μm. Additionally or alternatively, the CMOS type micro laser distance sensor may also be configured to be in various angles with respect to the printing bed. The various angels may range from 0 degrees (being parallel) to 90 degrees (being vertical).

In some examples, the CMOS type micro laser distance sensor may be a Panasonic® HG-C1050 sensor which has a measurement center distance of 50 mm, a measurement range of ±15 mm, a repeatability of 30 μm, a linearity of ±0.1% F.S., and a temperature characteristics of 0.03% F.S./° C.

Figure 6:
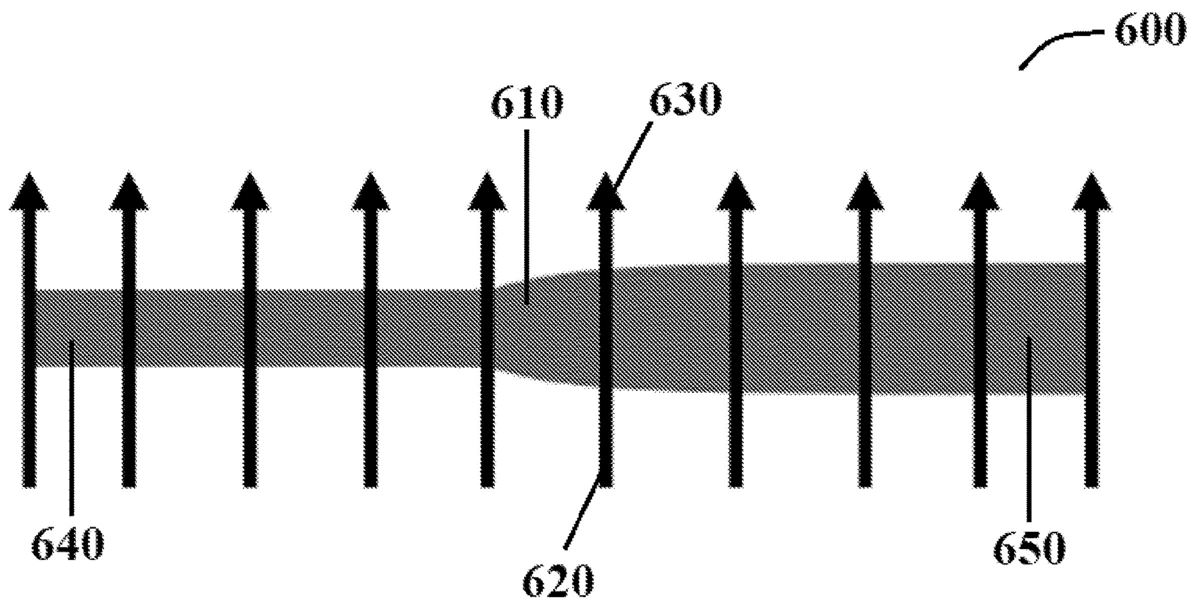
FIG. 6 shows an example of a laser distance sensor scanning method according to an embodiment of the disclosure.

In an example 600 of the laser distance sensor scanning method, the geometry information may be captured by scanning a printed track 610 vertically at equally-distanced points as shown in FIG. 6, where the scanning pattern is highlighted in vertical straight bold black lines 620 and the scanning directions are indicated by the arrows 630. In this example 600, both height information and width information could be retrieved with the laser distance sensor. More specifically, as the laser distance sensor moves along a specific indicated bold black line 620 in its arrow direction 630, the height information of the printed track 610 in the z-axis, in this example perpendicular to both the indicated bold black line 620 in the y-axis and the printed track 610 in the x-axis, along the arrow direction 630 of the printed track 610, is obtained in real time by the laser distance sensor (e.g., Panasonic® HG-C1050 sensor). The width information of the printed track 610 is also obtained because there are two abrupt height changes when the laser distance sensor first moves from the printing bed area into the printed track area along the arrow direction 630 and then from the printed track area to the printing bed area again. In other words, in this example, the height information of the printed track 610 along one indicated arrow direction 630 may be obtained in real time while the width information of the printed track 610 may be measured by calculating the distance between two abrupt height changes along the indicated arrow direction 630, which may also be the distance between the two edges of the height peaks of the printed track 610. The distance measurement line along the indicated arrow direction in this example is perpendicular to the printed track 610.

More specifically, in the example 600 shown in FIG. 6, the left part 640 of the printed track 610 covered by the left group of scanning trajectories of the scanning module are narrower than the right part 650 of the printed track 610 covered by the right group of scanning trajectories of the scanning module. Therefore, the distance between the two edges of the height peaks on the left part of the printed track 610 is shorter than the distance between the two edges of the height peaks on the right part of the printed track 610.

Step S103 includes an image and data processing step where the printing system extracts the geometry information of the printed tracks captured in step S102 from recorded images and/or recorded videos.

In an example of an image and data processing step, the data processing may be based on one or more libraries of programming functions for computer visions (e.g., Python OpenCV). The image processing step in this example is described as follows.

Figure 7:
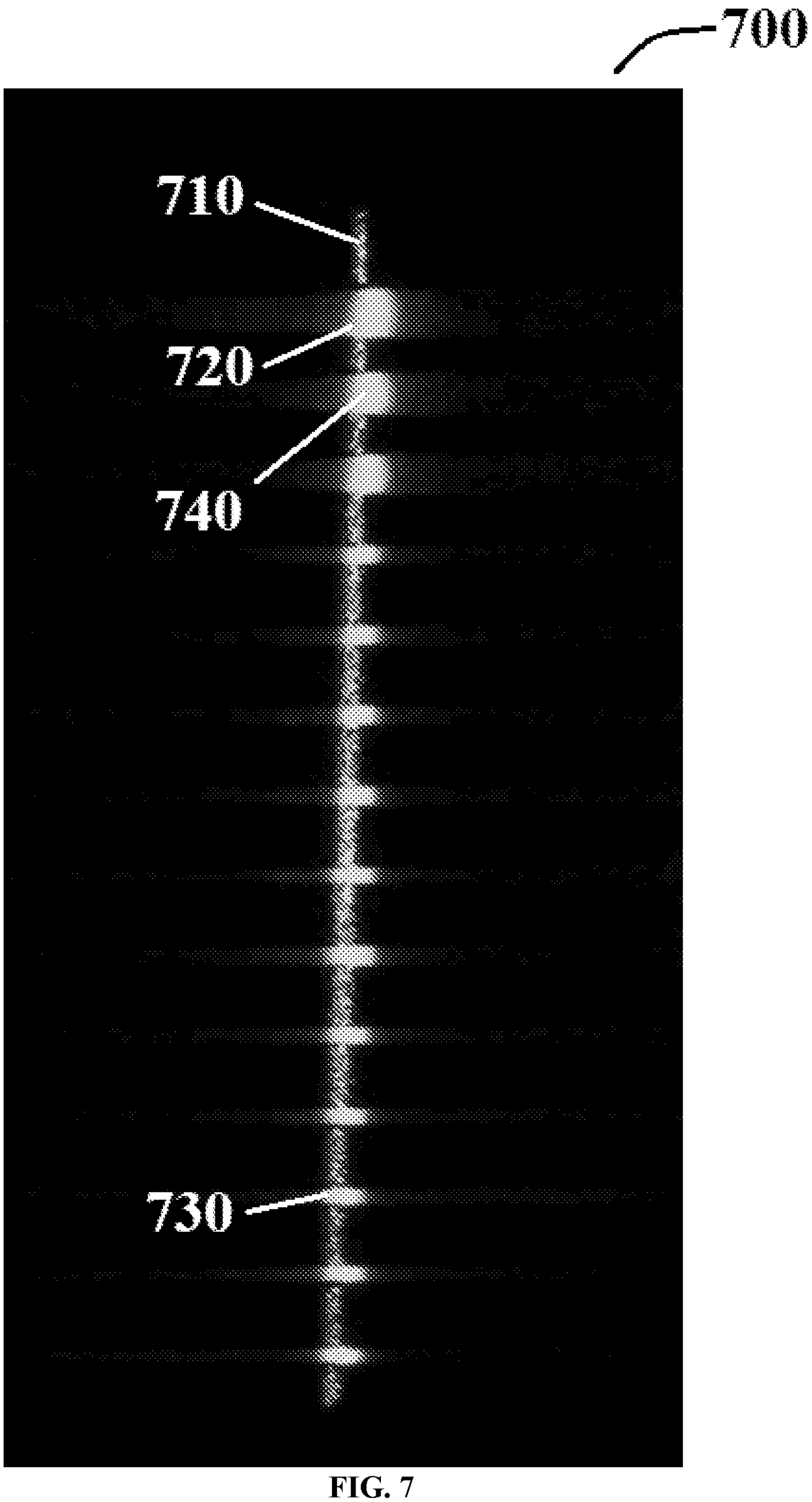
FIG. 7 shows an example of an imaging processing step according to an embodiment of the disclosure.

An example 700 of the image processing step is shown in FIG. 7 where the laser beam 710 is projected along a trajectory direction of the scanning module with regards to the printed tracks 720, the printed tracks 720 being a series of parallel tracks in a horizontal direction in the figure. More specifically, in FIG. 7, the lower group 730 of the printed tracks 720 are narrower than the upper group 740 of the printed tracks 720 and portions of the printed tracks 720 intersected by the projected laser beam 710 are brightened and highlighted as blocks in a color brighter than both that of the portions of the printed tracks 720 not intersected by the projected laser beam 710 and that of the printing bed in the background. In the example as shown in FIG. 7, the specific direction is perpendicular to the series of printed parallel tracks 720, which are not horizontally highlighted in the figure. For each one of the series of the printed parallel tracks 720, the movement trajectory of the laser beam 710 may interest a printed track twice: first time when the laser beam 710 moves from the background printing pad into the intersected printed track and second time when the laser beam 710 moves from the intersected printed track back to the background printing pad. Locations of these two intersection points may be determined then to calculate the width of the intersected printed track. Optionally, the locations of one or more of these points may be pre-determined before step S103, modified in real-time during step S103, or updated after step S103.

In an example of the image processing step, the printing system may perform the following steps to measure the width of each printed track. First, the captured image may be converted from a color image to a gray image by a Python OpenCV program (e.g., the cv2.cvtColor) or other applicable programs. Second, the converted gray image may be filtered by a Python OpenCV Gaussian filter (e.g., cv2.GaussianBlur) or other image filters to filter high frequency noises. Third, a pre-determined location point and a straight line from the pre-determined location point along a corresponding direction may be determined where the intersection points of the straight line and the highlighted blocks are used to determine block width.

Figure 8A:
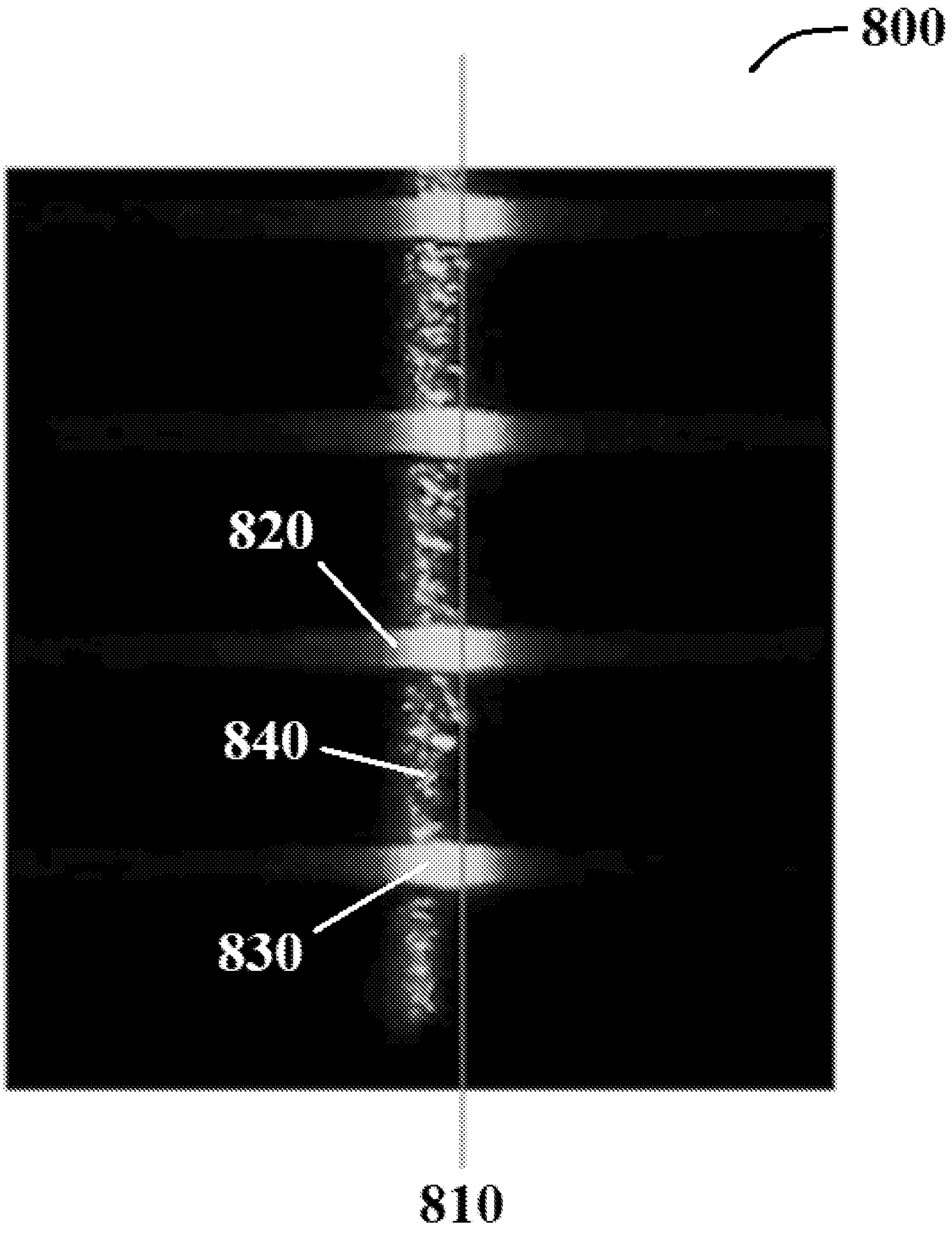
FIG. 8A shows a portion of the example of the imaging processing step according to the embodiment of FIG. 7.
Figure 8B:
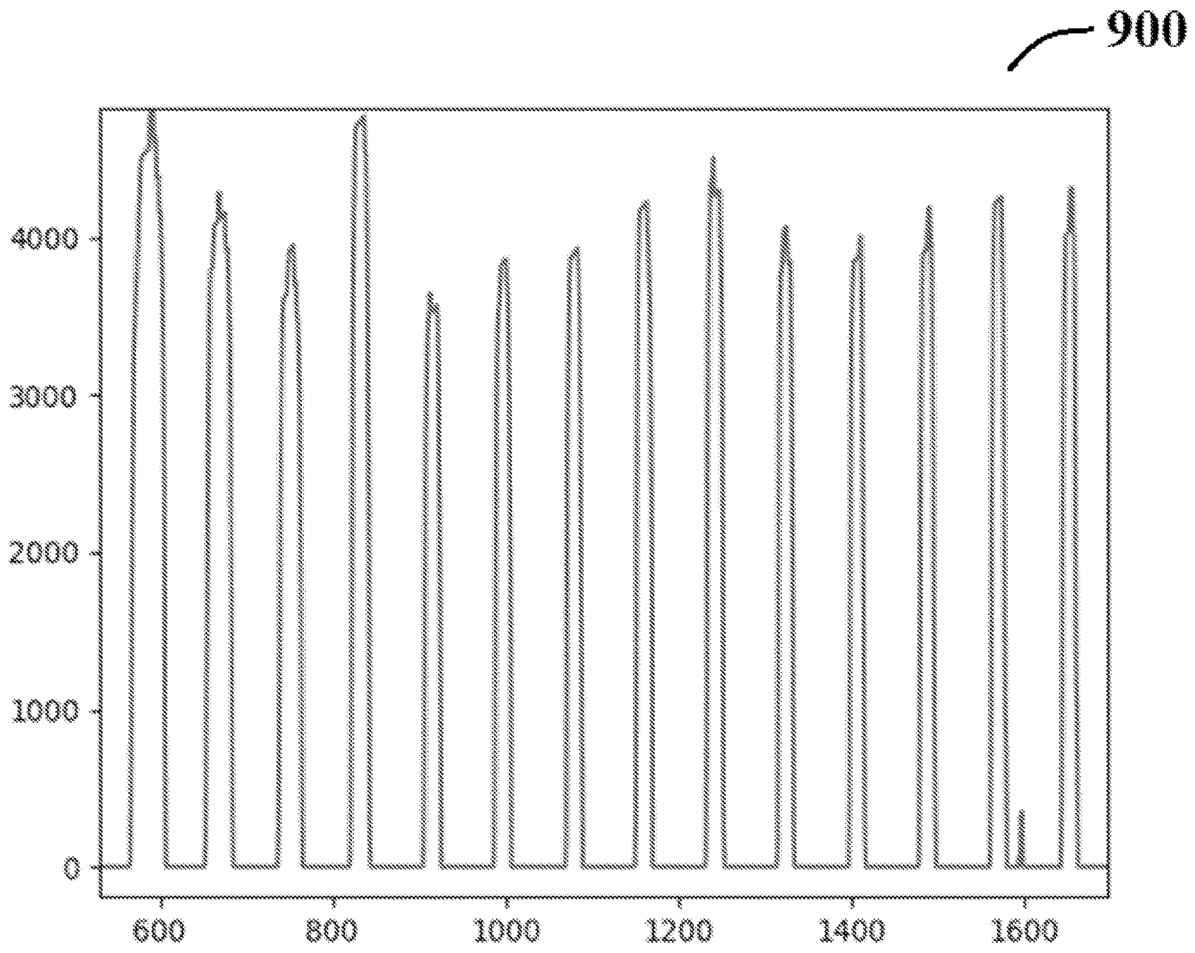
FIG. 8B shows a sum curve of signals of intersection points to the right of the straight line in FIG. 8A.

In an example 800 shown in FIG. 8A, the straight line 810 is perpendicular to the series of the printed parallel tracks 820 and the straight line 810 is slightly off to the right of centers of the highlighted blocks 830 brightened by the laser beam 840. Such an offset may be implemented to reduce scattered noise points between adjacent highlighted blocks 830 along the direction of the straight line 810; the offset may be pre-determined before step S103, modified in real-time during step S103, or updated after step S103; and the offset, in additional or alternative examples, may also be to the left of centers of the highlighted blocks 830 depending on positions of noise points between adjacent highlighted blocks 830 or positions of various parts of the printing system. Next, the printing system may implement one or more algorithms to process the converted gray image to obtain a sum of signals of intersection points to the right of the straight line in FIG. 8A and the obtained sum of signals is shown as a sum curve 900 in FIG. 8B where the width information of the printed tracks 820 may be further obtained from.

Here, it is worth noting that the projected laser beam may or may not be vertical in the captured image as shown in FIG. 7 and FIG. 8A. Therefore, before the tracks are printed, a picture with only the laser beam projected to the printing bed without the printed tracks may be taken first and the orientation of the projected laser beam may be identified by linearly fitting (or by other mathematical methods) points in the picture taken. If the projected laser beam is vertical, no further processing is required; if the projected laser beam is not vertical, a further compensation and/or correction process may be performed.

In an example of a laser distance sensor scanning method, the data acquisition and processing step afterwards may be straightforward in that one or more cameras may be used to capture the geometry information by video, the height information of the printed track may be obtained in real time directly from sensors, and the width information of the printed track may be measured by calculating the distance between two edges of the height peaks of the printed track as explained in step S102.

Step S104 includes a model generation step where the geometry information (e.g., width and height) obtained in step S103 and, alternatively or additionally, the extrusion rate commands may be used with or without a loss of generality to generate a printing model. In some examples, the measured geometry information and extrusion rate command may be used for model generation through one or more curve fitting processes. Additionally or alternatively, the printing model generation may be implemented by second-order polynomial functions based on the obtained geometry information of the printed tracks and the extrusion rate commands in G-code or other computer numerical control (CNC) programming languages with or without a loss of generality. In other examples, other mathematical models of higher order may implement the printing model generation. More specifically, mathematical models of higher order may be implemented based on the fitting results if the fitting error is too high for second-order models, models of higher order may be selected based on the fitting accuracy in the simulation. Additionally, the printing model generation may also be implemented by other mathematical tools and models included in commercially available software programs such as those available in MATLAB—MathWorks, Origin—OriginLab, Microsoft Excel, etc.

In some examples of step S104, a user may run one or more printing tests, measure the actual geometry information (e.g., width, height, etc.) of one or more printed tracks and generate various printing models using mathematical models based on the actually measured geometry information of the printed tracks, various extrusion rates, and/or other printing parameters in step S101.

Step S105 includes a model evaluation step where the printing model generated in step S104 is evaluated by one or more simulations to determine whether the model generated in step S104 meets the requirement, and if not, whether additional tests are needed to improve the model generated in step S104.

In an example of the model evaluation step S105, the printing system may perform one or two sets of printing tests and the data collected in these printing tests may be used to compare with the results computed by the model generated in step S104. If the error between the printing tests in step S105 and the model generated in step S104 is within a pre-defined threshold, the generated model is considered complete and the model generated in step S104 may then be implemented as a reference for choosing extrusion parameters of the printing system. If the error between the two is outside the pre-defined threshold, more cycles of steps 101, 102, 103, and 104 may be repeated. Optionally, the pre-defined threshold may be chosen as 2% to 5% of the root mean square of the measured output.

Various embodiments of the disclosure may have one or more the following effects. In some embodiments, the disclosure may help to avoid trial and error calibration for different kinematic setups. In other embodiments, the disclosure may automate the parameter optimization process through generating models of different process parameters from limited number of printing tests and adopting them as a reference for parameter selection.

Many different arrangements of the various components depicted, as well as components not shown, are possible without departing from the spirit and scope of the present disclosure. Embodiments of the present disclosure have been described with the intent to be illustrative rather than restrictive. Alternative embodiments will become apparent to those skilled in the art that do not depart from its scope. A skilled artisan may develop alternative means of implementing the aforementioned improvements without departing from the scope of the present disclosure.

It will be understood that certain features and subcombinations are of utility and may be employed without reference to other features and subcombinations and are conmoduled within the scope of the claims. Unless indicated otherwise, not all steps listed in the various figures need be carried out in the specific order described.

The disclosure claimed is:

1. A method for calibrating extrusion parameters in an additive manufacturing system, comprising:

(1) executing extrusion commands and printing a plurality of tracks based on one or more printing templates at different extrusion rates;

(2) scanning the plurality of tracks to obtain at least one image of the plurality of tracks;

(3) processing the at least one image of the plurality of tracks to obtain geometry information, the geometry information comprising width and height of each one of the plurality of tracks;

(4) generating a printing model based on the geometry information and the extrusion commands;

(5) evaluating the printing model by:

(5.1) printing at least one test and collecting printing data from the at least one test;

(5.2) comparing the printing data with data produced from the printing model to obtain a printing error result; and (5.3) determining whether the printing error result is within a pre-defined threshold;

(6) if the printing error result from step (5) is within the pre-defined threshold, adopting the printing model in step (4) as a reference for choosing extrusion parameters at a given extrusion rate; and (7) if the printing error result from step (5) is not within the pre-defined threshold, repeating steps (1)-(6); and wherein step (3) comprises:

(3.1) converting a color image to a gray image, the color image being captured by a camera;

(3.2) filtering high frequency noises from the gray image;

(3.3) for each one of the plurality of tracks, determining a location point and a straight line through the location point in the gray image; and (3.4) for each one of the plurality of tracks, determining the width using intersection points of: the straight line associated with a respective said track; and portions of the respective said track highlighted by the laser beam.

2. The method according to claim 1, wherein the extrusion commands are compiled in G-code.

3. The method according to claim 1, wherein the one or more printing templates comprise at least one item selected from the group consisting of a steady-state template, a material leakage template, and a velocity transition template.

4. The method according to claim 1, wherein the height is obtained by a laser distance sensor, the laser distance sensor being part of a scanning module.

5. The method according to claim 4, wherein:

step (2) further comprises projecting a laser beam towards at least one of the printed tracks at an angle along a direction on a printing bed;

the laser beam is generated by a laser module; and the laser module is part of a scanning module.

6. The method according to claim 5, wherein the angle is between about 45 degrees to about 50 degrees.

7. The method according to claim 1, wherein the width of a respective said track is determined using a distance between two edges of the respective said track along the direction of the laser beam on the printing bed.

8. The method according to claim 1, wherein the width of a respective said track is determined using a distance between two of the intersection points.

9. The method according to claim 1, wherein the printing model is generated by a polynomial function of second or higher order.

10. An additive manufacturing system, comprising a processor, a printing nozzle, and a scanning module, the scanning module comprising a camera and the processor being configured to:

(1) execute extrusion commands actuating the printing nozzle to print a plurality of tracks based on one or more printing templates at different extrusion rates;

(2) actuate the scanning module to scan the plurality of tracks to obtain at least one image of the plurality of tracks;

(3) process the at least one image of the plurality of tracks to obtain geometry information, the geometry information comprising width and height of each one of the plurality of tracks;

(4) generate a printing model based on the geometry information and the extrusion commands;

(5) evaluate the printing model by:

(5.1) printing at least one test and collecting printing data from the at least one test;

(5.2) comparing the printing data with data produced from the printing model to obtain a printing error result; and (5.3) determining whether the printing error result is within a pre-defined threshold;

(6) if the printing error result from step (5) is within the pre-defined threshold, adopt the printing model in step (4) as a reference for choosing extrusion parameters at a given extrusion rate; and (7) if the printing error result from step (5) is not within the pre-defined threshold, repeat steps (1)-(6); and wherein step (3) comprises:

(3.1) converting a color image to a gray image, the color image being captured by a camera;

(3.2) filtering high frequency noises from the gray image;

(3.3) for each one of the plurality of tracks, determining a location point and a straight line through the location point in the gray image; and (3.4) for each one of the plurality of tracks, determining the width using intersection points of: the straight line associated with a respective said track; and portions of the respective said track highlighted by the laser beam.

11. The additive manufacturing system according to claim 10, wherein the extrusion commands are compiled in G-code.

12. The additive manufacturing system according to claim 10, wherein the one or more printing templates comprise at least one item selected from the group consisting of a steady-state template, a material leakage template, and a velocity transition template.

13. The additive manufacturing system according to claim 10, wherein the height is obtained by a laser distance sensor, the laser distance sensor being part of the scanning module.

14. The additive manufacturing system according to claim 13, wherein:

step (2) further comprises projecting a laser beam towards at least one of the printed tracks at an angle along a direction on a printing bed;

the laser beam is generated by a laser module; and the laser module is part of a scanning module.

15. The additive manufacturing system according to claim 14, wherein the angle is between about 45 degrees to about 50 degrees.

16. The additive manufacturing system according to claim 10, wherein the width of a respective said track is determined using a distance between two edges of the respective said track along the direction of the laser beam on the printing bed.

17. The additive manufacturing system according to claim 10, the width of a respective said track is determined using a distance between two of the intersection points.

18. The additive manufacturing system according to claim 10, wherein the printing model is generated by a polynomial function of second or higher order.

* * * * *